United States Patent
Rosenberg

(10) Patent No.: US 10,547,653 B2
(45) Date of Patent: Jan. 28, 2020

(54) MANAGING ACCESS TO COMMUNICATION SESSIONS VIA A WEB-BASED COLLABORATION ROOM SERVICE

(71) Applicant: Cisco Technology, Inc., San Jose, CA (US)

(72) Inventor: Jonathan Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 436 days.

(21) Appl. No.: 15/289,327

(22) Filed: Oct. 10, 2016

(65) Prior Publication Data

US 2018/0103074 A1    Apr. 12, 2018

(51) Int. Cl.
| | |
|---|---|
| *H04L 29/06* | (2006.01) |
| *G06F 3/0482* | (2013.01) |
| *G06F 3/14* | (2006.01) |

(52) U.S. Cl.
CPC ........ *H04L 65/1093* (2013.01); *G06F 3/0482* (2013.01); *G06F 3/1454* (2013.01); *H04L 65/1069* (2013.01); *H04L 65/403* (2013.01)

(58) Field of Classification Search
CPC ............. H04L 12/1818; H04L 12/1813; H04L 12/1822; H04N 7/15

(Continued)

(56) References Cited

U.S. PATENT DOCUMENTS

| | | |
|---|---|---|
| 6,119,147 A | 9/2000 | Toomey et al. |
| 7,664,490 B2 | 2/2010 | Aaby et al. |

(Continued)

FOREIGN PATENT DOCUMENTS

| | | |
|---|---|---|
| EP | 1705913 A1 | 9/2006 |
| WO | 2009/089585 A1 | 7/2009 |

OTHER PUBLICATIONS

Bowersox, "What is the architecture of a scalable URL shortener?", http://www.quora.com/What-is-the-architecture-of-a-scalable-URL-shortener, Aug. 2014, 3 pages.

(Continued)

*Primary Examiner* — Mahran Y Abu Roumi
(74) *Attorney, Agent, or Firm* — Edell, Shaprio & Finnan, LLC

(57) ABSTRACT

A server is configured to host a web-based collaboration room through which user devices of member users are able to communicate. Each of the member users is assigned a distinct communication identifier. The server generates for display at each of the user devices a selectable start option associated with the communication identifier assigned to the user of the user device. The server receives from a first user device among the user devices a selection of the start option and that includes the communication identifier of a first user among the users. In response, the server initiates a communication session, connects the first user device to the communication session, links the received communication identifier to the communication session, and generates for display at each of the user devices a respective selectable join option associated with the linked communication identifier and by which the communication session is accessible.

20 Claims, 14 Drawing Sheets

(58) Field of Classification Search
USPC .................................................. 709/204
See application file for complete search history.

(56) References Cited

U.S. PATENT DOCUMENTS

| | | | |
|---|---|---|---|
| 7,764,632 B2 | 7/2010 | Gray et al. | |
| 7,876,714 B2 | 1/2011 | Ethier et al. | |
| 8,045,489 B2 | 10/2011 | Lee et al. | |
| 8,200,756 B2 | 6/2012 | Kamiely | |
| 8,245,141 B1 | 8/2012 | Fuller et al. | |
| 8,281,248 B2* | 10/2012 | Kurpick | G06Q 10/00 709/205 |
| 8,286,183 B2 | 10/2012 | Baird et al. | |
| 8,319,816 B1 | 11/2012 | Swanson et al. | |
| 8,346,231 B1 | 1/2013 | Smith et al. | |
| 8,375,132 B2 | 2/2013 | Hernanz | |
| 8,402,091 B2 | 3/2013 | Kamiely | |
| 8,478,622 B2 | 7/2013 | Grodum | |
| 8,713,662 B2 | 4/2014 | Staurnes et al. | |
| 8,732,244 B2 | 5/2014 | Kamiely | |
| 8,831,197 B2 | 9/2014 | Prabhune et al. | |
| 2002/0075306 A1* | 6/2002 | Thompson | G06F 3/0481 715/753 |
| 2005/0058088 A1 | 3/2005 | Decker et al. | |
| 2007/0208806 A1 | 9/2007 | Mordecai et al. | |
| 2008/0244419 A1* | 10/2008 | Kurpick | G06Q 10/00 715/756 |
| 2009/0013045 A1 | 1/2009 | Maes et al. | |
| 2009/0043849 A1 | 2/2009 | Blackburn et al. | |
| 2011/0179272 A1* | 7/2011 | Klos | H04L 12/1818 713/168 |
| 2011/0319117 A1* | 12/2011 | Gonsalves | H04L 12/1822 455/519 |
| 2012/0054836 A1 | 3/2012 | Chien et al. | |
| 2012/0314849 A1 | 12/2012 | LeBlanc et al. | |
| 2013/0018950 A1 | 1/2013 | Narayanan et al. | |
| 2013/0235866 A1* | 9/2013 | Tian | H04L 12/1822 370/352 |
| 2014/0095871 A1 | 4/2014 | Hoard et al. | |
| 2014/0096266 A1 | 4/2014 | Hoard et al. | |
| 2017/0070706 A1* | 3/2017 | Ursin | H04L 12/1822 |

OTHER PUBLICATIONS

B. Desruisseaux, "Internet Calendaring and Scheduling Core Object Specification (iCalendar)", IETF, Network Working Group, Category: Standards Track, RFC 5545, Sep. 2009, 168 pages.

Stack Overflow, "How to code a URL shortener?", http://stackoverflow.com/questions/742013/how-to-code-a-url-shortener, Aug. 28, 2014, 9 pages.

"Audio Controls Guide and Release Notes for FR29", Conferencing & Collaboration, User Guide, Cisco WebEx, Apr. 2012, 11 pages.

"WebEx Meeting Center User Guide", For Hosts, Presenters, and Participants, Cisco WebEx, www.webex.com, May 2, 2013, 414 pages.

Gatekeeper Software Solutions, LLC, "PRIME Virtual Waiting Room", http://www.gatekeeperwebsolutions.com/prime-virtual-waiting-room, Retrieved Nov. 3, 2014, 3 Pages.

International Search Report and Written Opinion in corresponding International Application No. PCT/US2017/054841, dated Jan. 22, 2018, 12 pages.

* cited by examiner

200

```
┌─────────────────────────────────────────────────────┐
│ ASSIGN TO USERS REGISTERED WITH A CSA SERVICE (I.E.,│
│ "REGISTERED USERS") RESPECTIVE COMMUNICATION        │──205
│ IDENTIFIERS THAT REGISTERED USERS AND UNREGISTERED  │
│ USERS OF THE CSA SERVICE USE TO ACCESS COMMUNICATION│
│ SESSIONS (SUPPORTED BY ONE OR MORE COMMUNICATION    │
│ SERVICES) VIA USER DEVICES                          │
└─────────────────────────────────────────────────────┘
                           ↓
┌─────────────────────────────────────────────────────┐
│ ACCESS/COMMUNICATE WITH ONE OR MORE COMMUNICATION   │──210
│ SERVICES TO LEARN INFORMATION ASSOCIATED WITH       │
│ COMMUNICATION SESSIONS THAT ARE BOTH IN-PROGRESS AND│
│ SCHEDULED WITH RESPECT TO THE REGISTERED USERS      │
└─────────────────────────────────────────────────────┘
                           ↓
┌─────────────────────────────────────────────────────┐
│ MAP EACH COMMUNICATION IDENTIFIER TO A LIST OF      │──215
│ COMMUNICATION SESSIONS, IF ANY, IN WHICH THE        │
│ RESPECTIVE REGISTERED USER IS CURRENTLY             │
│ PARTICIPATING AND/OR IS SCHEDULED TO PARTICIPATE    │
│ BASED ON THE INFORMATION LEARNED AT 210             │
└─────────────────────────────────────────────────────┘
                           ↓
┌─────────────────────────────────────────────────────┐
│ RECEIVE FROM A USER DEVICE A JOIN REQUEST FROM      │──220
│ A REQUESTER (I.E., FROM A USER DEVICE ASSOCIATED    │
│ WITH THE REQUESTOR), THE JOIN REQUEST INDICATING A  │
│ PARTICULAR COMMUNICATION IDENTIFIER OF A PARTICULAR │
│ USER REGISTERED WITH THE SERVICE AND A REQUESTER    │
│ IDENTIFIER                                          │
└─────────────────────────────────────────────────────┘
                           ↓
┌─────────────────────────────────────────────────────┐
│ CONNECT THE USER DEVICE (ASSOCIATED WITH THE        │──225
│ REQUESTOR) TO A COMMUNICATION SESSION, IF ANY,      │
│ BASED ON THE PARTICULAR COMMUNICATION IDENTIFIER    │
│ AND THE REQUESTER IDENTIFIER                        │
└─────────────────────────────────────────────────────┘
```

MANAGING ACCESS TO COMMUNICATION SESSIONS VIA A WEB-BASED COLLABORATION ROOM SERVICE

TECHNICAL FIELD

The present disclosure relates to managing access to communication sessions.

BACKGROUND

It is common in a web-based collaboration room to want to add a guest to a web-based meeting that is outside of the web-based collaboration room, where that guest may not be a user of the service through which the collaboration room is instantiated. Adding the guest may require the user that wants to add the guest to know the email address of the guest. Also, once the user enters the email address, the guest may be required to wait to receive an email message at the email address, and to then click a link provided in the email message. Furthermore, if the guest is not already a user of the collaboration room service, the guest may need to "sign up" for the service before entering the meeting. This process can be inconvenient for both the user wanting to add the guest to the meeting, and the guest.

BRIEF DESCRIPTION OF THE DRAWINGS

FIG. 2 is a flowchart of a method of controlling/managing user access to communication sessions performed by a communication session access service of FIG. 1, according to an example embodiment.

DESCRIPTION OF EXAMPLE EMBODIMENTS

Overview

Figure 1:
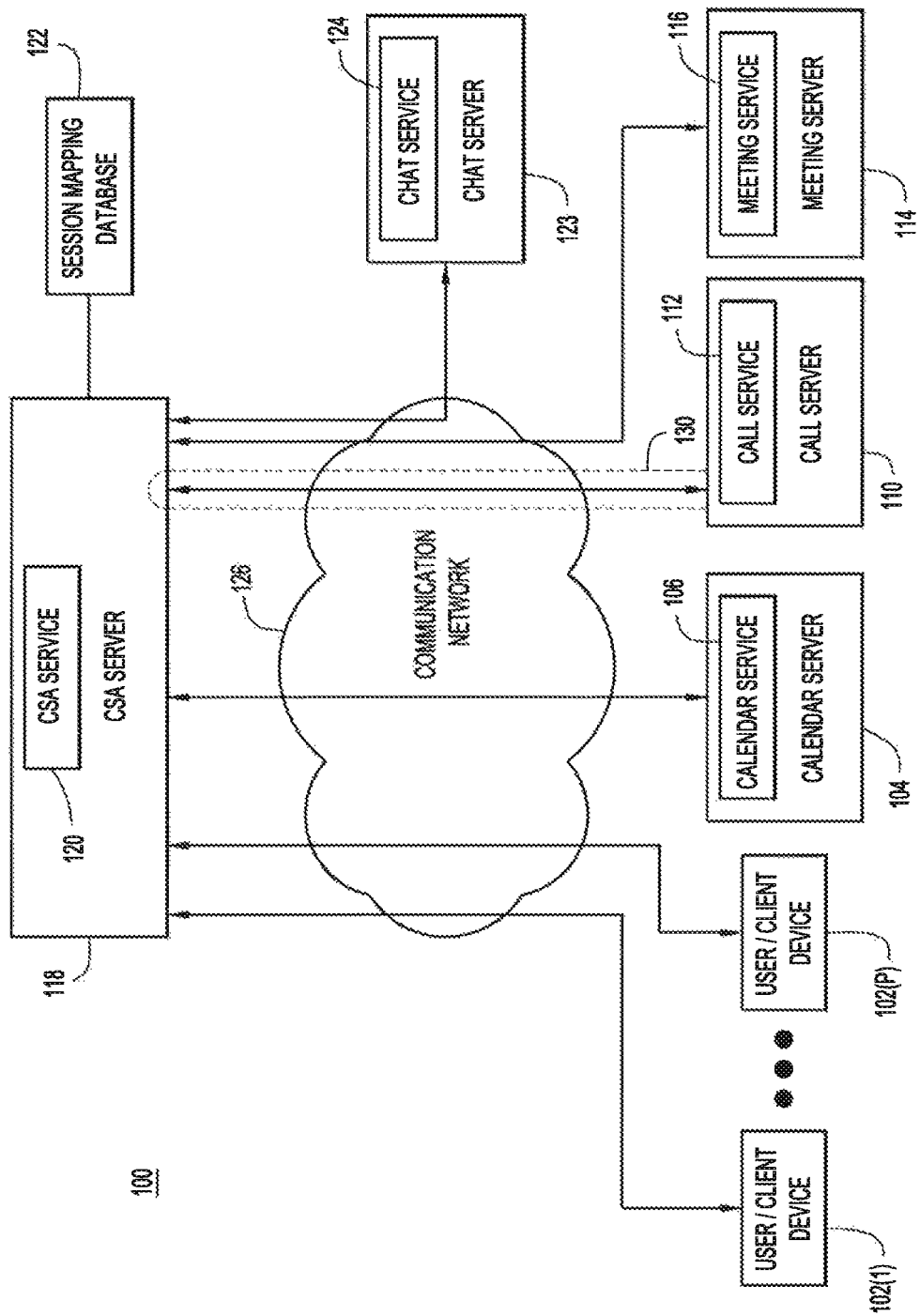
FIG. 1 is a diagram of a network environment in which system and methods for managing access to communication sessions using communication identifiers associated with users of a communication service may be deployed, according to an example embodiment.

In one embodiment, one or more servers are configured to host a web-based collaboration room through which user devices of users who are members of the collaboration room communicate. Each of the users who is a member is assigned a distinct communication identifier used to initiate or access a communication session supported by a communication service. The one or more servers generate for display at each of the user devices a respective selectable start option associated with the communication identifier assigned to the user of the user device. The one or more servers receive from a first user device among the user devices a selection of the respective start option and that includes the communication identifier of a first user among the users. In response to the receiving, the one or more servers initiate a communication session, connect the first user device to the communication session, link the received communication identifier to the communication session, and generate for display at each of the user devices a respective selectable join option associated with the linked communication identifier and by which the communication session is accessible.

Example Embodiments

According to embodiments presented, a communication session access (CSA) service simplifies user access to communication sessions supported by communication services using communication identifiers assigned to users registered with the CSA service. That is, the CSA service assigns to each registered user a unique communication identifier. In one example, the communication identifier may be a mnemonic Hypertext Transfer Protocol (HTTP) Uniform Resource Locator (URL), such as "http://zip.ciscospark.com/ownername." The registered user, "ownername," to which the communication identifier is assigned is referred to as the "owner" of the communication identifier. In another example, the communication identifier may be associated with a telephone number assigned to the user, and may be accessible by dialing the telephone number in combination with a dialed pin number unique to the user to which the communication identifier is assigned, for example. In another example, the communication identifier may be a Session Initiation Protocol (SIP) URI, such as sip: ownername@zip.ciscospark.com. The communication identifier is also referred to herein as a "zip" identifier.

The unique communication identifier assigned to a user "points to" or otherwise indicates all calls and/or web-based meetings (collectively and generically referred to as "communication sessions") in which the user is currently participating and/or scheduled to participate, but does not uniquely identify any specific call or web-based meeting. Similarly, accessing the communications identifier can also create a new meeting with its owner. In this way, the communication identifier can be said to "follow the user around" over time as the user places calls and schedules and joins different web-based meetings. "Calls" and "web-based meetings" will be described in further detail on below.

An example use of a communication identifier is when a user to which the communication identifier is assigned wishes to schedule a web-based meeting. In that case, that user inserts the communication identifier into a calendar invite and sends the calendar invite to intended participants/invitees, who receive the calendar invite. To join the web-based meeting at an appointed time, invitees select, e.g., click on, the communication identifier in their respective calendar invites, which results in the invitees being joined to the web-based meeting. A useful property of the communication identifier is that if the user/owner is in any web-based meeting or call, regardless of whether the user scheduled the web-based meeting or placed/made the call, the communication identifier indicates all of the web-based meetings and/or calls that the user is in, or could be in.

A user is said to be in a call or a web-based meeting if the user is sending/receiving media in that call or web-based meeting (a call or a meeting on hold still counts as sending or receiving media). Some non-limiting examples of when a user is considered to be in a call or a web-based meeting are as follows: the user is participating in a call and has not been put on hold; the user is participating in a call, but has been put on hold; the user is in a scheduled meeting; the user is in an ad-hoc meeting; the user is in a collaboration chat room (such as those provided by Cisco Spark) and someone has started an ad-hoc web-based meeting in the collaboration chat room, however the user has not joined that meeting yet; the user, or someone else, has scheduled a web-based meeting, and that meeting is in progress, however, the user has not yet joined that meeting.

From the perspective of any user, rules for using the communication identifier are straightforward. Non-limiting examples of the rules include the following.

If a user wishes to schedule a web-based meeting, the user accesses a calendar, pastes the communication identifier assigned to the user into a calendar invite, and sends the calendar invite to other individuals. Others can join the scheduled web-based meeting simply by clicking on the communication identifier in their received invites. This works for back-to-back web-based meetings and web-based meetings scheduled in parallel.

If a user wishes to add someone to a web-based meeting or a call, the user sends or otherwise provide that person the communication identifier owned by the user. If the person clicks on the communication identifier, the person will be able to join the web-based meeting. The user may be asked to approve the person before the person is admitted to the web-based meeting or call.

Use of the communication identifiers to control access to communication sessions in the context of a network environment is now described in detail.

Referring first to FIG. 1, a diagram is shown of an example network environment 100 in which embodiments directed to managing access to communication sessions using communication identifiers associated with users may be deployed. Environment 100 includes multiple user/client devices 102(1)-102(P) (also referred to as user devices 102) operated by respective users (not specifically shown in FIG. 1), a calendar server 104 to host a calendar service 106, a call server 110 to host a call service 112, a meeting server 114 to host a web-based meeting service 116, a communication session access (CSA) server 118 to host a CSA service 120 that interfaces with a session mapping database 122, a chat server 123 to host a messaging or chat service 124, and a communication network 126 over which the user devices, and aforementioned servers/services communicate. Communication network 112 may be any one or more of a wired or wireless local area networks (LANs) and wired or wireless wide area network (WANs), including the Internet and the Public Switched Telephone Network (PSTN). Communication network 112 may support a variety of data protocols, including without limitations, Session Initiation Protocol (SIP), HTTP, Real-time Transport Protocol (RTP), and also circuit switch protocols. While FIG. 1 shows single servers to host respective ones of services 106, 112, 116, 120, and 124, it is to be understood that each service may be distributed across many geographically dispersed servers, and there may be many instances of each service. Also, various ones of the servers and services may be integrated together/combined. For example, CSA service 120 and meeting service 116 may integrated into a single collaboration service hosted on a server.

Call service 112 and meeting service 116 are examples of respective communication services that support/manage respective communication sessions to which one or more of user devices 102 connect to communicate with each other. Call service 112 supports/manages communication sessions as "calls" between various ones of user devices 102 connected to the call service over communication network 126. The calls include, but are not limited to, voice-only calls, multimedia (voice, audio, image, and data) calls, voice-over-Internet Protocol (IP) calls, and so on. Call service 112 and CSA service 120 may use computer telephony integration (CTI) to exchange call control information with each other. CSA service 120 accesses the call control information to learn of calls that are in-progress and identities of parties connected to the calls, and stores the information in session mapping database 122. The identities of the parties may include identifiers for user devices 102 and personal identifiers of the users. In addition, call trunks 130 carrying the calls may be looped between call service 112 and CSA service 120 to enable the CSA service to add new callers into the looped calls via call controls accessible to the CSA service 120.

Meeting service 116 supports/manages communication sessions as web-based meetings between various ones of user devices 102 connected to the meeting service over communication network 126. In general, a web-based meeting (also referred to as an "online" meeting) is a meeting that is conducted over the Internet, for example, and managed by meeting service 116 that presents web-pages to each user device connected to the same meeting to mimic a collaborative environment in which users can converse in audio, video and electronically share documents and other data in real-time. Web-based meetings may include personal meeting rooms, collaboration meeting rooms, and so on. Meeting service 116 and CSA service 120 may communicate with each other using web-based meeting application program interfaces (APIs) hosted on servers 114 and 118. Using the APIs, CSA service 120 accesses web-based meeting information to learn of meetings that are in-progress and identities of parties connected to the web-based meetings, and stores the information in session mapping database 122. CSA service 120 may also use the APIs to create and add users to web-based meetings.

Calendar service 106 interacts with user devices 102 to enable users of the user devices to schedule calls and web-based meetings with each other, and the calendar service generates scheduling information for all such scheduled communication sessions. As an example, calendar service 106 may be by embodied by Microsoft Exchange® or other similar calendar server software now known or hereinafter developed. Calendar service 106 may also implement calendar fusion technologies. Calendar fusion technologies leverage server-side calendar integrations using calendaring application programming interfaces (APIs), such as Exchange Web Services (EWS). Such server-side calendar integrations allow applications to have full access to the calendars of users (e.g., users of user devices 102). This means the server-side calendar integrations have access to scheduled communication sessions and, for each scheduled communication session, scheduling information including, email addresses of participants invited to the session, a list of attendees to whom an invitation to the communication session was forwarded, a list of recipients of the forwarded invitation and who accepted and declined the forwarded invitation, and start and stop times of the session. CSA service 120 accesses the scheduling information generated by calendar service 106 and stores the information in session mapping database 122 in association with the information accessed from call service 112 and meeting service 116. In another embodiment, a plugin may be installed into the calendar application on the user device 102(1), which communicates directly with the CSA service 120. As the user schedules or changes meetings, the client plugin communicates this information to the CSA.

Chat service 124 hosts instant messaging (IM, or chat) applications that user devices 102 may invoke to enable users of the user devices to engage in chat sessions or enter chat rooms with each other. The chat rooms may be 1-1 or 1-Many, for example. Chat service 124 communicates, and shares information, with CSA service 120 to provide the users of user devices 102 with convenient access to communication sessions managed by the CSA service, as will be described below. The chat service 124 may be one service or application that is part of a broader collaboration service from which users can engage in chat sessions, initiate voice calls, initiate video calls, upload documents to a shared workspace, and initiate web-based meetings. Thus, in the example of FIG. 1, CSA service 120 and chat service 124 are shown as separate entities; however, it is understood that the chat service may be integrated or combined with the CSA service to form a collaboration service.

User devices 102 may each take on a variety of forms, including a landline telephone, SmartPhone, tablet, laptop computer, desktop computer, video conference endpoint, and the like. User devices 102 may each host a call application used to make calls from the user device, a calendar application such as Microsoft Outlook® software application and Outlook plugins, and a web-based conference client application that communicates with the calendar application. Users of user devices 102 may use the calendar applications to schedule communication sessions into a user calendar at a date and time in the future. The calendar applications are capable of scheduling an appointment and sending an invitation to users, i.e., other user devices, as well as receiving an invitation from other users. When a user accepts a calendar invitation, the calendar application stores information for the communication session. Calendar service 106 interacts with the calendar applications of user devices 102 to access communication session information stored by the calendar applications, and then compiles that information into communication session records accessible to CSA service 120. In an example, communication session information compiled by calendar service 106 for a given web-based meeting may include all, or a subset of, the following items: a unique identifier for the meeting; an identifier of a host of the meeting; a list of invitees (i.e., invitee identifiers) to the meeting; and a start time and an end time of the meeting. The identifier of the host and each invitee identifier may each include one or more of a name and an email address, for example.

In accordance with embodiments presented herein, CSA service 120 controls user accesses to communication sessions supported by call service 112 and meeting service 116, both ad-hoc and ones scheduled with calendar service 106. More specifically, CSA service 120 starts communication sessions for users and adds users to communication sessions already in-progress in a way that is convenient and straight forward for the users through the use of communication or "zip" identifiers, as discussed briefly above. In one embodiment, chat service 124 interoperates with CSA service 120 to provide users with easy access to communication sessions, as will be described below.

With reference to FIG. 2, there is a flowchart of an example method 200 of controlling/managing user access to communication sessions performed by CSA service 120. The communication sessions include calls and web-based meetings supported by call service 112 and meeting service 116, respectively, to which user devices 102 connect.

At 205, CSA service 120 assigns to users registered with the CSA service (i.e., "registered users") respective communication identifiers that both registered users and unregistered users of the CSA service may use to access the CSA service through user devices 102. More specifically, using the communication identifiers, users of CSA service 120 may start communication sessions and/or add other users to communication sessions already in-progress in a way that is convenient and straight forward for the users. Each communication identifier is configured to be entered by or acquired from a user via user devices 102, and communicated from the user devices to CSA service 120 or other user devices over communication network 126. CSA service 126 also associates each communication identifier with a personal identifier of the registered user to which the communication identifier is assigned. Thus, CSA service 126 records, for each registered user thereof, the respective communication identifier and the personal identifier associated with the communication identifier.

In one example, the communication identifier may be a mnemonic HTTP URL, such as "http://zip.ciscospark.com/ownername." The registered user, "ownername," to which the communication identifier is assigned is referred to as the "owner" of the communication identifier. In another example, the communication identifier may be similar to a telephone number assigned to the user or may be accessible through the use of a telephone number in combination with a dialed pin number, for example. As described below, the unique communication identifier assigned to a user indicates/points to all communication sessions in which the user is currently participating and/or scheduled to participate, but does not uniquely identify any specific call or web-based meeting.

At 210, CSA service 120 accesses/communicates with (i) call service 112 to learn of calls that are in-progress and identities of parties connected to the calls, (ii) meeting service 116 to learn of web-based meetings that are in-progress and identities of parties connected to the in-progress meetings, and (iii) calendar service 106 to learn of scheduled calls and web-based meetings and information associated with the scheduled calls and web-based meetings. CSA service 120 stores the information accessed in (i), (ii), and (iii) in session mapping database 122 in connection with the assigned communication identifiers, as described below in connection with operation 215.

At 215, based on the information accessed at 210, CSA service 120 maps each communication identifier directly or indirectly to a corresponding list of communication sessions, if any, that the registered user to which the communication identifier is assigned is currently participating and/or is scheduled to participate. The mappings are stored in session mapping database 122, for example. In one example, the communication identifier directly points to the corresponding list of communication sessions. In another example, the personal identifier associated with the communication identifier directly points to the corresponding list of communication sessions.

To join a communication session, a user sends, from one of user devices 102 to CSA service 120 over communication network 126, a join request to join the communication session. The join request indicates, e.g., includes, a particular communication identifier of a particular user registered with the service. The join request also indicates a personal identifier of the user that sent the join request. In an example, an email address of the user may be used as the personal identifier, although other types of personal identifiers may be used. In the ensuing description, the user that sent the join request may be referred to as a "requester" and the user device from which the join request is sent may be referred to as the "user device associated with the requester" or the "requester user device."

In an example, to send the join request from the user device associated with requester, the requester may click on the communication identifier when presented by that user device in a selectable form in a meeting invite. In response, that user device creates and then sends the join request to CSA service 118 based on the communication identifier (e.g., the communication identifier directs the join request to the CSA service). In this case, the communication identifier may be considered a meeting join (or join meeting) link; however the join link does not identify any specific communication session, rather, it may indicate many different communication sessions associated with the particular user to which the particular communication identifier is assigned. In an example, the join request may include a cookie that indicates the requester identifier, e.g., an email address of the requester, and that was previously assigned to the requester by CSA service 122. The cookie could have been previously stored on the user device associated with the requester.

At 220, CSA service 120 receives from the user device associated with the requester the join request indicating (i) the particular communication identifier of the particular user registered with the service, and (ii) the requester identifier.

At 225, CSA service 120 connects the user device associated with the requestor to a communication session, if any, based on the particular communication identifier and the requester identifier. To do this, CSA service 120 (i) examines the list of communication sessions mapped to/indicated by the particular communication identifier, (ii) compares the requester identifier to a particular user identifier indicated by the particular communication identifier, and (iii) connects the user device to a communication session, if any, based on the results of the examine and the compare operations. In an example, the particular user identifier may be an email address of the particular user, although other personal identifiers may be used.

Figure 3:
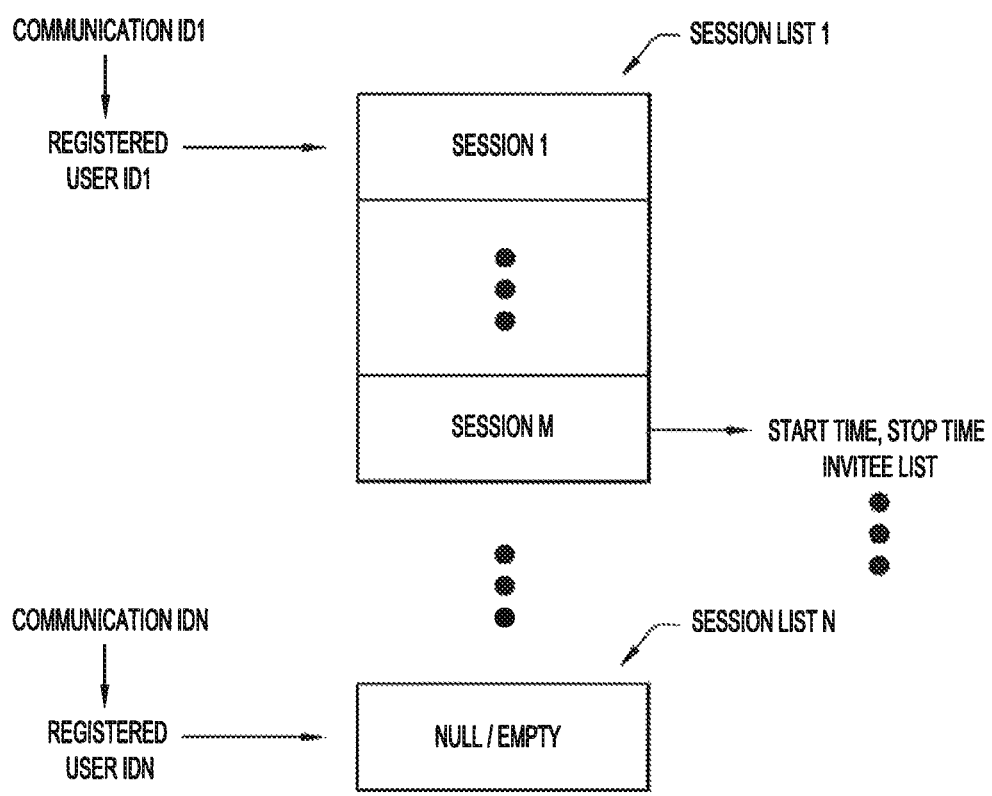
FIG. 3 is an illustration of a session mapping database used to assist with managing access to communication sessions, according to an example embodiment.

With reference to FIG. 3, there is an illustration of an example of session mapping database 122. Database 122 includes communication session lists 1-N (referred to as "session lists 1-N") each for a corresponding one of communication identifiers (IDs) 1-N and associated ones of registered user IDs 1-N (e.g., respective email addresses of the registered users), which may be mapped to corresponding ones of the communication identifiers. CSA service 120 compiles session lists 1-N in operations 210 and 215, described above. Either communication IDs 1-N or registered user IDs 1-N may be used as indexes to corresponding ones of session lists 1-N. Each of session lists 1-N includes a list of the communication sessions (e.g., calls and web-based meetings), if any, that the registered user to which the communication identifier is assigned is currently participating and/or is scheduled to participate. For example, session list 1 indicates that registered user 1 is currently participating in or scheduled to participate in multiple communication sessions 1-M. In another example, session list N indicates that registered user N is not participating in or scheduled to participate in any call, thus, session list N is an empty/null list.

Information/entries for each of communication sessions 1-M may take different forms depending on the type of communication session to which the entry applies, such as a web-based meeting or a call. For example, an entry for a web-based meeting may include a host ID of the host of the meeting, such as a hostname and a host email address, start and stop times, and a list of invitees (i.e., a list of participants invited to the meeting). The list of invitees/participants may include identifiers of each invitee, e.g., a name and an email address of each invitee. An entry for a call, which may include a scheduled call, or a call that is in progress, may include information similar to that for a web-based meeting, or a subset of that information. For example, an entry for a call may include a telephone number, identities of parties in the call (e.g., a participants list to the call), and so on.

In summary, users are assigned unique communication or "zip" identifiers. Each communication identifier indicates all of the web-based meetings and calls the user to which the communication identifier is assigned is or could be (e.g., is scheduled to be) in. This feature makes it easy to add others to the meetings or calls; e.g., the others simply click on the communication identifier. When a person clicks on the communication identifier, a join request is sent to a CSA service. The CSA service determines if the person who clicked on the communication identifier is supposed to be in (i.e., is authorized for) the call or meeting. If yes, the person is admitted. If no, the owner of the communication identifier is prompted to admit the person into the appropriate call or meeting.

The communication identifier is not a unique URL for a meeting, i.e., each meeting does not have a unique URL; rather, every meeting in essence has multiple URLs that point to the meeting—one URL for each participant who is in, or could be in, that meeting. This makes it easy to add people to any meeting or call—the 'adder' only needs to know his or her on communication identifier, not the communication identifier of the user that scheduled or started the meeting. Accessing communication sessions based on the communication identifier is fundamentally an indirection process, which layers the communication identifier on top of existing unique meeting identifiers (e.g., an iCal user identifier) and SIP dialog identifier or other call identifiers. The communication identifier can be thought of as a telephone number, but instead of ringing the user that owns the telephone number, the telephone number rings the meeting or call the owner of the telephone number is in.

There are numerous advantages to the system and methods presented herein. People never wait for more than a few seconds to go into a meeting. For scheduled meetings, they go right into the meeting without having to wait for the host. The CSA service ensures that a user goes into the correct meeting through a combination of authorization lists and context combined with modal dialogs sent to the owner of the communication identifier. Adding someone to a meeting is easy, and involves sending or otherwise providing them with the communication identifier of a user. The types of sessions simplify to scheduled meetings, ad-hoc meetings, and calls. A user can be in an ad-hoc call on a desk phone, and to add another person, the user can simply email/Instant Message/tell the person the communication identifier of the user. If the person clicks on it, the modal dialog described above would render on the desk phone. According to the embodiments presented herein, multiple communication identifiers may be bound to each meeting—one for each participant, rather than having a single unique identifier to identify a meeting. Use of the communication identifiers may avoid complications that arise from collaboration room lobbies.

An embodiment that provides an easy and convenient way to add users to communication sessions is described below in connection with FIGS. 4-11. The embodiment may be used in conjunction with or, alternatively, independently of, the embodiments described above. Adding a user to communications sessions, e.g., web-based meetings or calls, can be inconvenient using conventional techniques. In the embodiments described above, a user may be added to a communication session by sending a communication identifier to the user. The embodiment described below provides another way for the user to be added to the web-based meeting or call.

A use case for the embodiment is a chat application (that may be part of a more comprehensive collaboration application, such as Cisco Systems' Spark™ service) by which a user can communicate to others a desire to have the others join a communication session (e.g., a voice call, video call, web-based meeting, etc.) in which the first user is a participant. The communication session exists outside of the chat application. In the embodiment, chat service 124 is connected with CSA service 120, and the CSA service 120 is aware of communication sessions in which users are participating. Thus, the chat service 124 is able to leverage awareness of communication sessions to simplify adding users connected with the chat applications to the communication sessions.

Figure 4A:
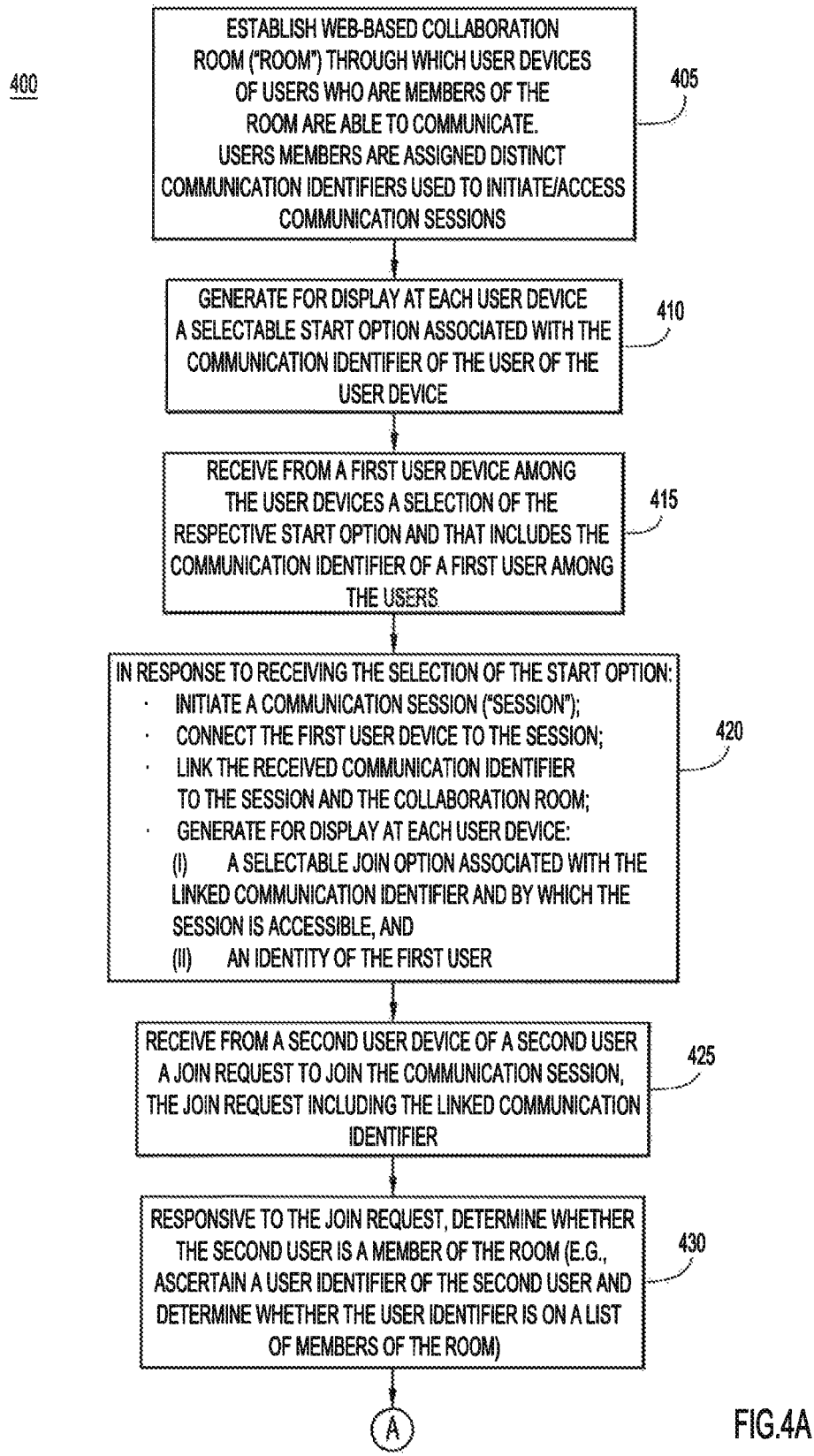
FIGS. 4A and 4B depict a flowchart of a method of adding a user to a communication session via a collaboration room, according to an example embodiment.
Figure 4B:
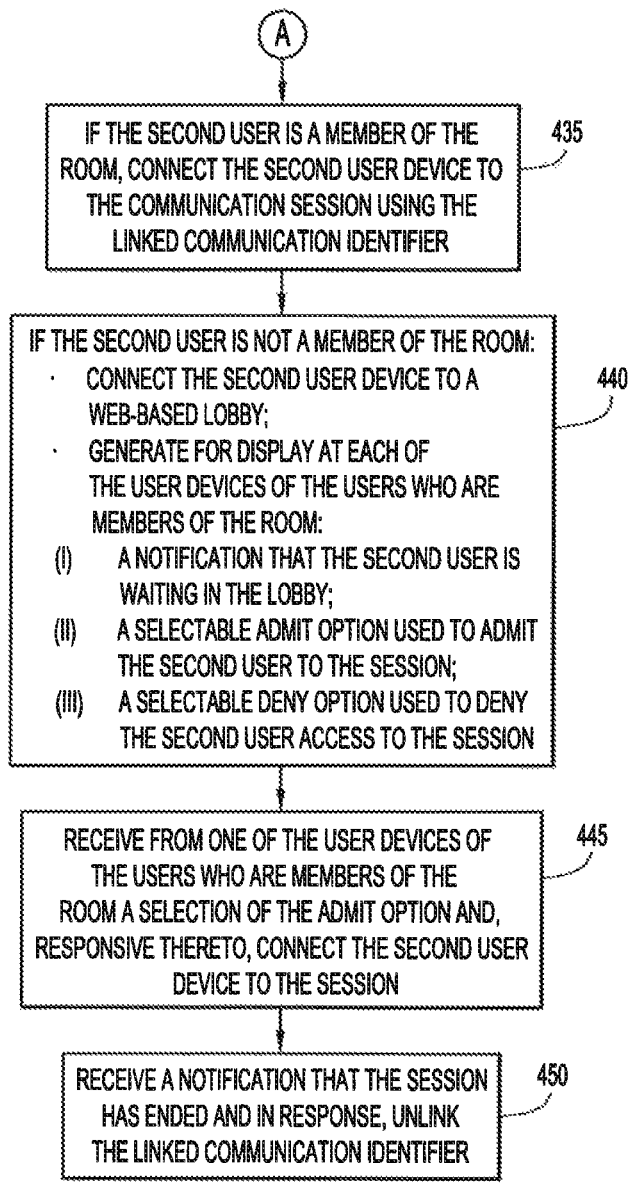

With reference to FIGS. 4A and 4B, there is a flowchart of a method 400 of adding a user to a communication session via a collaboration (chat) room according to the embodiment. Method 400 is described in connection with FIGS. 5-10. Reference may also be made to FIG. 1 for purposes of the description of FIGS. 4A and 4B. The communication session may be a web-based meeting or a call supported by call service 112. CSA 120 and chat service 124 (collectively referred to as "the Service" in the description of method 400) cooperate to perform method 400. In method 400, chat service 124 communicates with CSA 120 and thus has access to information generated and accessed by the CSA, e.g., information in session mapping database 122. Chat service 124 leverages this information in method 400.

At 405, the Service executes a collaboration chat room application to establish an instance of a web-based collaboration chat room (also referred to simply as a "collaboration room") through which user devices of/associated with users who are members of the collaboration room are able to communicate. A predetermined list of users who are members of the collaboration room (i.e., a collaboration room member list) may be stored on chat server 123 for access by chat service 124. The collaboration room member list may include a respective user name and a respective email address of each user who is a member. A distinct communication identifier is assigned to/associated with each user member and may be used to initiate and/or access a given communication session. The communication identifier may be a personal URL, such as http://ciscospark.com/owner-name, as described above.

At 410, the Service generates for display at each of the user devices of users who are members of the collaboration room and which are connected to the collaboration room: (i) a respective user selectable start-communication-session option, e.g., an icon, (also referred to more simply as a "start option") associated with the communication identifier of/associated with the user of the user device, and which is used by the associated user to initiate/start a new communication session, e.g., start an ad-hoc communication session; and optionally (ii) an indicator of an identity of the user of the user device, which may include a username and/or a thumbnail picture of the user, and may be displayed close to, or actually adorn, the start-communication-session option. The term "generate for display at each of the user devices" means, at least in part, to produce data/information in a form that may be rendered as an image on a display and to send the data/information to the user devices where the data/information is then rendered. In some instances, the data/information may be rendered on a local display associated with the Service.

Figure 5:
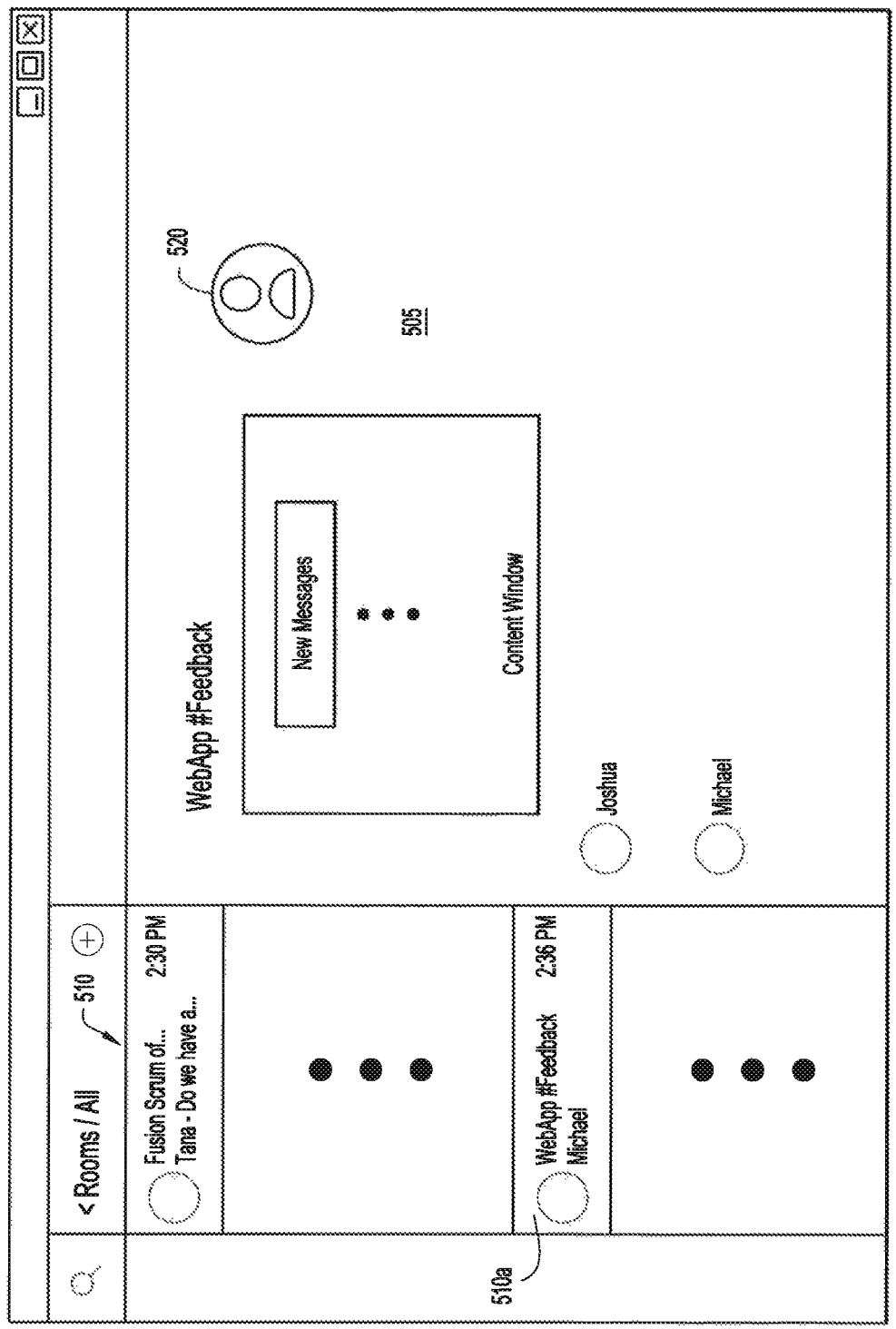
FIG. 5 is a user interface screen displayed on a user device participating in a collaboration room, according to an example embodiment.

With reference to FIG. 5, there is an example user interface screen 500 generated by the Service at 410 and displayed/presented on a display of a user device participating in (i.e., connected to) a collaboration room named Webapp #Feedback. Each user device participating in the collaboration room Webapp #Feedback displays a respective user interface screen similar to screen 500.

User interface screen 500 includes a main panel 505 that presents content being shared with other participants in the collaboration room Webapp #Feedback (i.e., uses of user devices connected to the collaboration room). User interface screen 500 also includes a series or column of smaller, user selectable, side panels 510 each to indicate, and linked to, a corresponding other collaboration room or a corresponding communication session (e.g., a web-based meeting). In other words, side panels 510 represent a list of accessible collaboration rooms, web-based meetings, shared work spaces, and so on. Selection of one of side panels 510 by a user activates that side panel and brings content from the corresponding collaboration room into main panel 505. Currently, middle side panel 510*a* corresponding to the collaboration room Webapp #Feedback is selected, so content being shared in the collaboration room Webapp #Feedback is displayed in main panel 505.

Main panel 505 also includes a user selectable start-communication-session option 520 (or "start button" 520) associated with the communication identifier of the user of the user device on which user interface screen 500 is displayed. Start-communication-session option 520 is used to start a communication session and, when selected, causes the associated communication identifier (i.e., "join link") to be sent to the Service in a join request message. In addition, option 520 includes an indicator of an identity of that user. In the example of FIG. 5, the identity is represented as a thumbnail picture of the user that adorns option 520.

At 415, the Service receives a selection of the respective start-communication-session option (e.g., option 520) from a first user device among the user devices and that is associated with a first user among the users who are members of the collaboration room. The selection may be represented as a join request from the second user device and that includes the communication identifier (i.e., join link) of the first user.

At 420, in response to receiving the selection of the start-communication-session option, the Service:
  a. Initiates/starts a new communication session;
  b. Connects the first user device to the communication session;
  c. Links or creates a binding of the communication identifier of the first user to the communication session and the collaboration room. The communication identifier is linked to the collaboration room because there may be other collaboration rooms executing concurrently. The communication identifier is thus associated with/points to the communication session and the collaboration room, and is referred as the "linked communication identifier." The linked communication identifier and information for the communication session to which the linked communication identifier points may be stored in session mapping database 122, as described in connection with FIG. 3; and
  d. Generates for display at each user device:
    i. A user selectable "join meeting" icon associated with the linked communication identifier and by which the communication session is accessible;
    ii. An identity of the first user in association with the user selectable join meeting icon; and optionally
    iii. A notification that the first user has started a meeting in the collaboration room.

Figure 6:
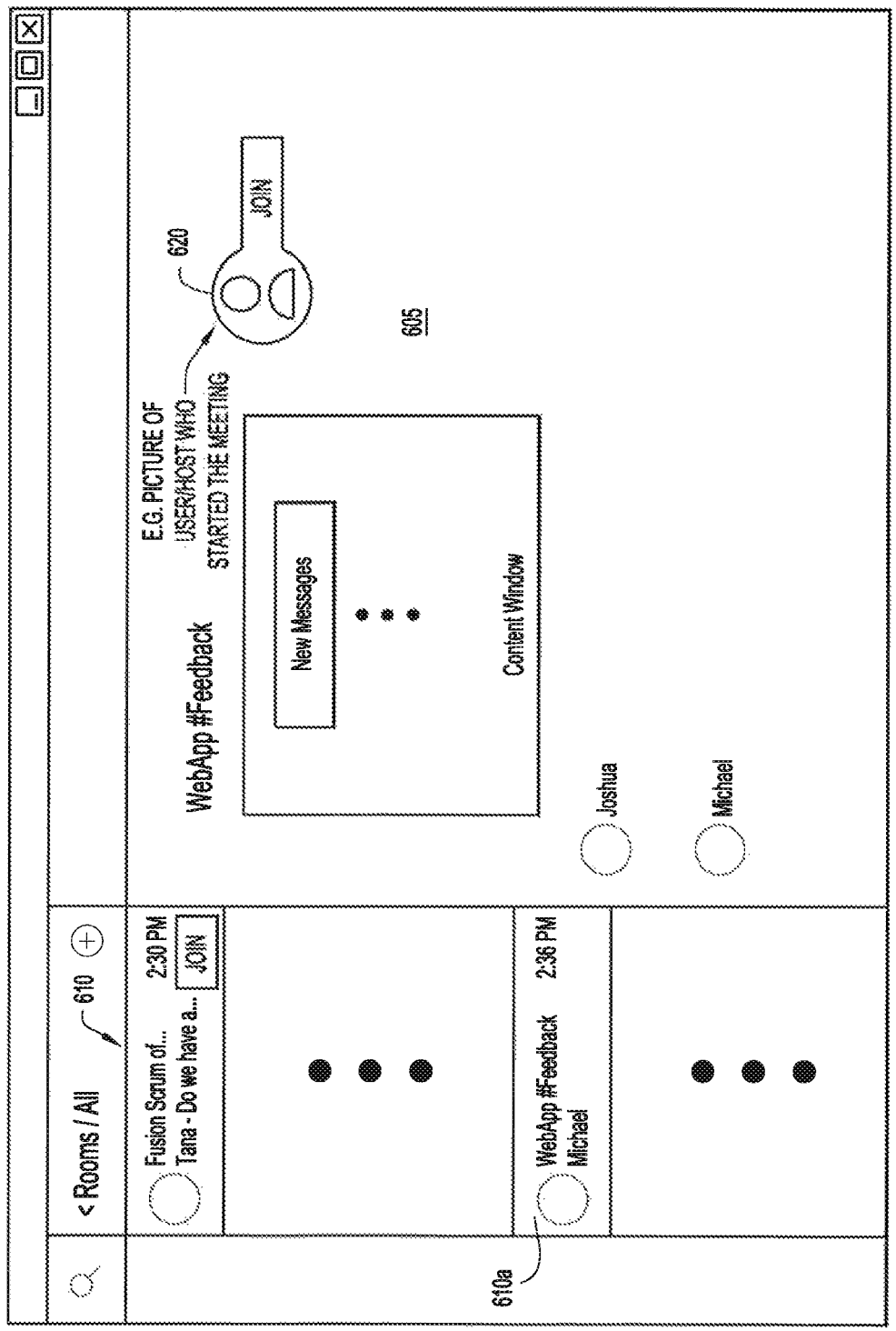
FIG. 6 is a user interface screen that includes a join option displayed on a user devices participating in the collaboration room, after a communication session has been initiated, according to an example embodiment.

With reference to FIG. 6, there is an example user interface screen 600 generated by the Service at operation 420 and displayed on the user devices participating in the collaboration room Webapp #Feedback, after the first user has selected start-communication-session option 805 at the first user device and a corresponding communication session has been initiated. The first user, whose linked communication identifier identifies the communication session, is referred to as the meeting host. In the example of FIG. 6, the communication session is a web-based meeting supported by meeting service 116, which is outside of chat service 124.

User interface screen 600 includes a main panel 605 (also referred to simply as "main panel" 605) and side panels 610 in which side panel 610*a* corresponding to the collaboration room Webapp #Feedback is selected. Main panel 605 displays a user selectable join meeting option 620 associated with the linked communication identifier of the first user (the meeting host/initiator). Join meeting option 620 indicates an identity of the first user. In the example of FIG. 6, join meeting option 620 is adorned with a thumbnail picture of the first user. When selected, join meeting option 620 causes the user device on which the join meeting option is selected to send the linked communication identifier (of the first user) to the Service to cause that user device to be joined to the communication session, as described below. In an embodiment, the communication session continues after the first user/host leaves the communication session.

Figure 7:
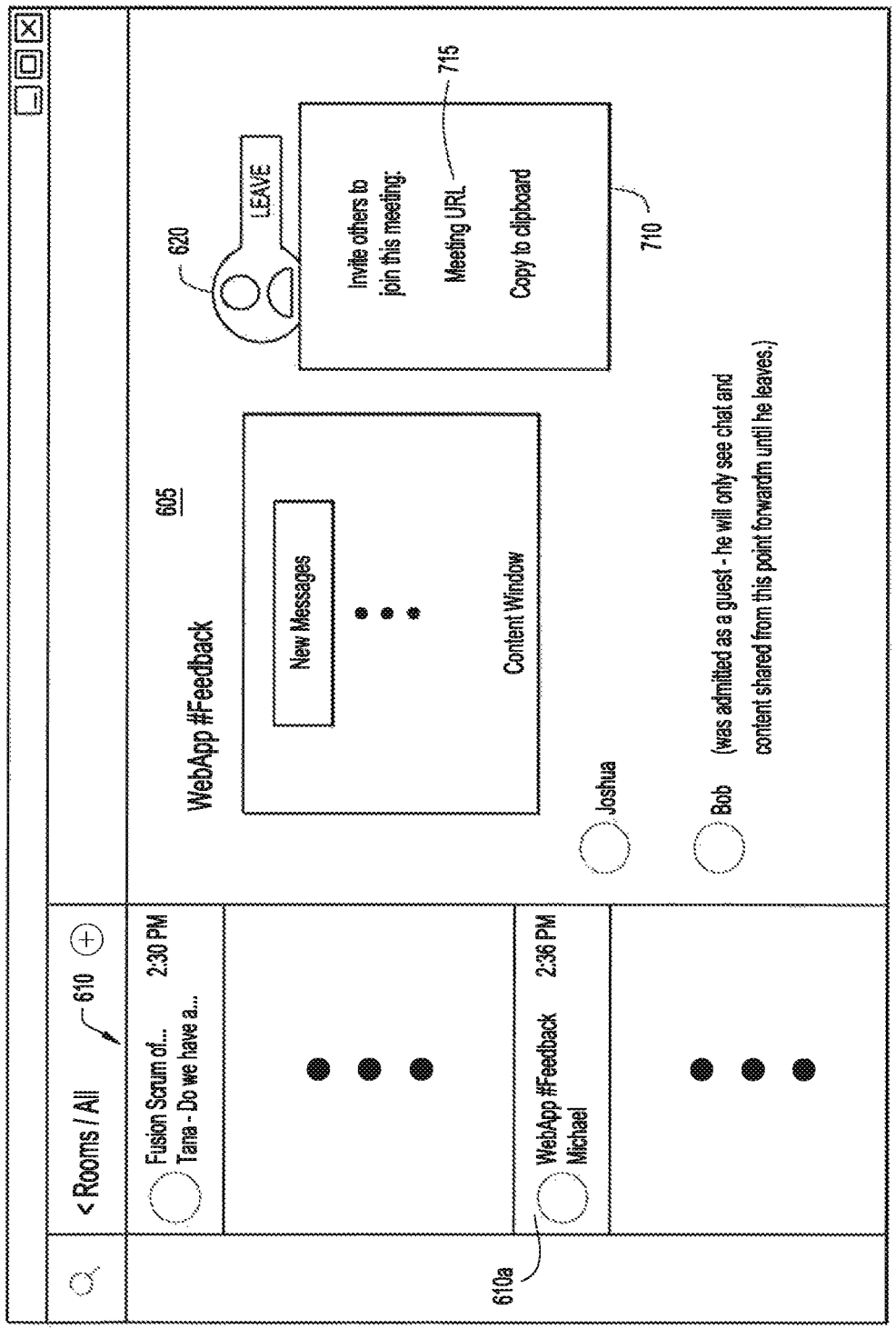
FIG. 7 is a user interface screen in which a communication identifier/join link underlying the join option is presented in a dialog box responsive to a partial selection of the join option, according to an example embodiment.

In an embodiment, join meeting option 620 is implemented at the user device on which it is displayed so that partially selecting the option exposes underlying information associated with the option that is useful for others interested in joining the communication session, as shown in FIG. 7, for example. FIG. 7 shows an example user interface screen 700 (similar to user interface screen 600) displayed on a user device responsive to hovering a cursor over, or otherwise partially selecting, join meeting option 620 as initially exposed in display panel 605. Partially selecting join meeting option 620 exposes a dialog box 710. Dialog box 710 includes the linked communication identifier 715 "Meeting URL" (e.g., http://ciscospark.com/ownername) associated with option 620 in a form that may be manipulated by user input at the user device, such as being copied to a clipboard, pasted into an invite message, and then transmitted to one or more other user devices over 126 in order to join the one or more other user devices to the communication session. Dialog box 710 may also include instructive text that indicates how the URL may be used.

Returning to FIG. 4A, at 425, the Service receives from a second user device of a second user a join request to join the communication session. The join request includes the linked communication identifier (i.e., join link). The join request may represent (or result from) a selection of the join meeting option (e.g., option 620) at one of the user devices associated with a user who is a member of the collaboration room, or may have been sent from a user device associated with a user who is not a member of the collaboration room. Users who are members of the collaboration room are automatically authorized to join the communication session. Users who or not members of the collaboration room are not automatically authorized to join the communication session.

Thus, at 430, responsive to receiving the join request, the Service determines whether the second user is a member of the collaboration room. To do this, the Service first ascertains a user identifier (e.g., an email address) of the second user and then determines whether the user identifier is on the collaboration room member list (e.g., is on a list of email addresses of the collaboration room members). The user identifier may already be known to the Service based on context, e.g., if the second user who is a member of the collaboration room is logged into the Service, or if the join request also includes the user identifier of the second user.

Alternatively the user identifier may not be known to the Service. In that case, the Service may generate for display at the second user device a prompt for the second user to enter a user identifier (e.g., an email address). The Service ascertains the user identifier after it has been received at the Service as a result of entry of the user identifier at the second user device. The Service determines whether the received user identifier is that of a member of the collaboration room. If yes, the Service simply authenticates the second user, i.e., assumes the user identifier is verified/valid.

If no, and assuming the user identifier is an email address, the Service verifies the email address. To do this, the Service sends to the email address an email message including a user selectable link that, when selected, causes the user device on which the link is selected to send a confirmatory message back to the Service that confirms/verifies the email address entered by the second user. Once the email address is confirmed/verified, the Service sends an indicator of the verified user identifier to the user device from which the confirmatory message was received for storage at that user device. In an example, the indicator includes a cookie that is stored together with the verified email address in a browser at the user device. The indicator avoids the need to verify the same email address in the future.

Figure 8:
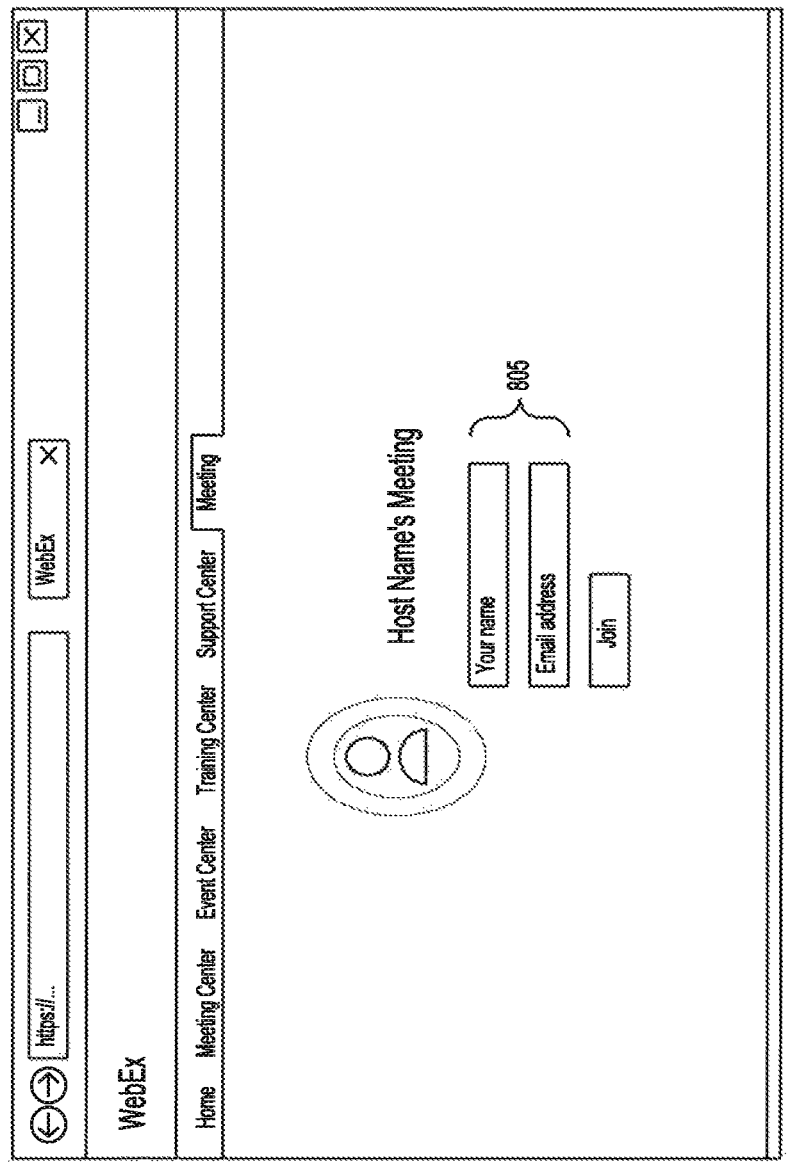
FIG. 8 is a user interface screen of a webpage sent to a user device to prompt entry of user identifiers (e.g., email address/username), according to an example embodiment.

With reference to FIG. 8, there is shown a user interface screen of an example webpage 800 sent by the Service to a user device (e.g., the second user device) at operation 430, as presented by the user device to a user, to prompt the user (as shown at reference numeral 805) to enter one or more user identifiers, e.g., a username and an email address of the user. Once the user has entered the username and user identifier, e.g., email address, the user clicks the "Join"

button, which causes the user device to send a message including the entered user identifier information to the Service, as described above.

Returning to FIG. 4B, at 435, if it is determined that the second user is a member of the collaboration room, the Service connects the second user device to the communication session using the linked communication identifier, since members are automatically authorized for the communication session.

At 440, if it is determined that the second user is not a member of the collaboration room and is therefore not automatically authorized for the communication session, the Service:

a. Connects the second user device to a web-based lobby (also referred to as a "virtual lobby") in which the second user device is communicatively isolated from other user devices that are connected to the virtual lobby, i.e., the virtual lobby disables voice and/or video communication between the second user device and any other user device connected to the virtual lobby;

b. Generates for display at the user devices of the users who are members of the collaboration room, and which are participating in/connected to the collaboration room, (i) a notification that the second user is waiting in the lobby, (ii) a user selectable Admit option used to admit the second user to the communication session, (iii) a user selectable Deny option used to deny the second user access to the communication session, and (iv) a user selectable Leave option used to leave the meeting. The Admit and Deny options, when selected, cause the second user device connected to the lobby to be connected/admitted to the communication session and denied access to the communication session, respectively. When any of the Admit, Deny, or Leave options is selected at the user device on which the options are displayed, that user device sends a corresponding selection (e.g., Admit selection, Deny selection, or Leave selection) to the Service, which acts according to whichever selection was received (e.g., to admit, to deny, or to leave), as described below; and c. Generates for display at the second user device connected to the lobby a notification that the second user is waiting to be admitted to the communication session.

Figure 9:
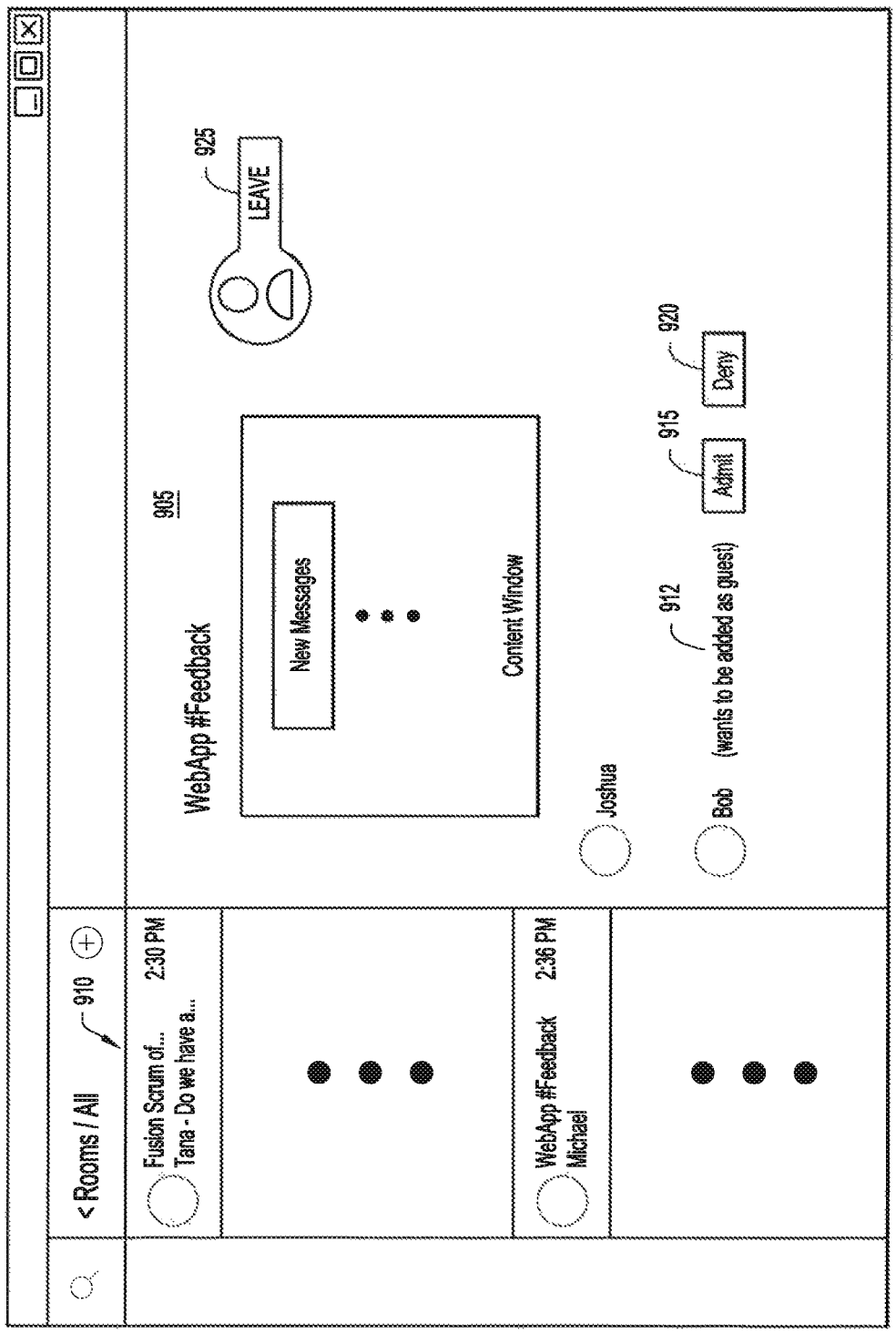
FIG. 9 is a user interface screen displayed on a user device participating in the collaboration room, after a user device has been connected to a virtual lobby, according to an example embodiment.

With reference to FIG. 9, there is a there is shown a user interface screen 900 generated by the Service and displayed on the user devices participating in the collaboration room Webapp #Feedback, after the second user has been connected to the lobby. User interface screen 900 includes a main panel 905 and side panels 910 similar to user interface screen 800. Main panel 905 includes (i) a notification 912 that the second user (e.g., Bob) is waiting (in the lobby) to be admitted to the communication session, (ii) a user selectable Admit option 915 that, when selected, causes the Service to admit the second user device to the communication session, (iii) a user selectable Deny option 920 that, when selected, causes the Service to deny the second user access to the communication session, and (iv) a user selectable Leave option 925 that, when selected, causes the Service to disconnect from the communication session the user device on which user interface screen 900 is displayed.

Figure 10:
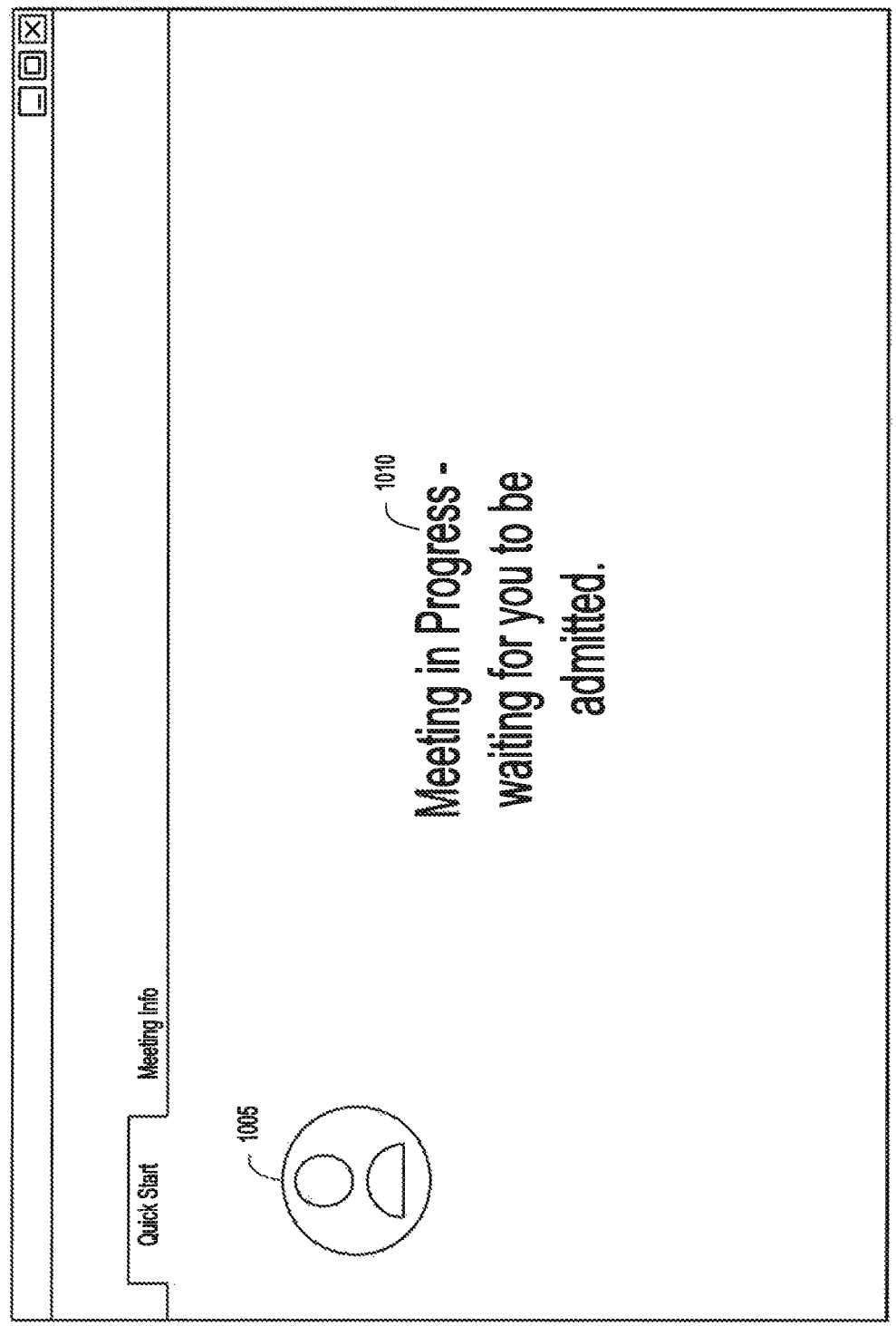
FIG. 10 is a user interface screen displayed on the user device connected to the lobby, according to an example embodiment.
Figure 11:
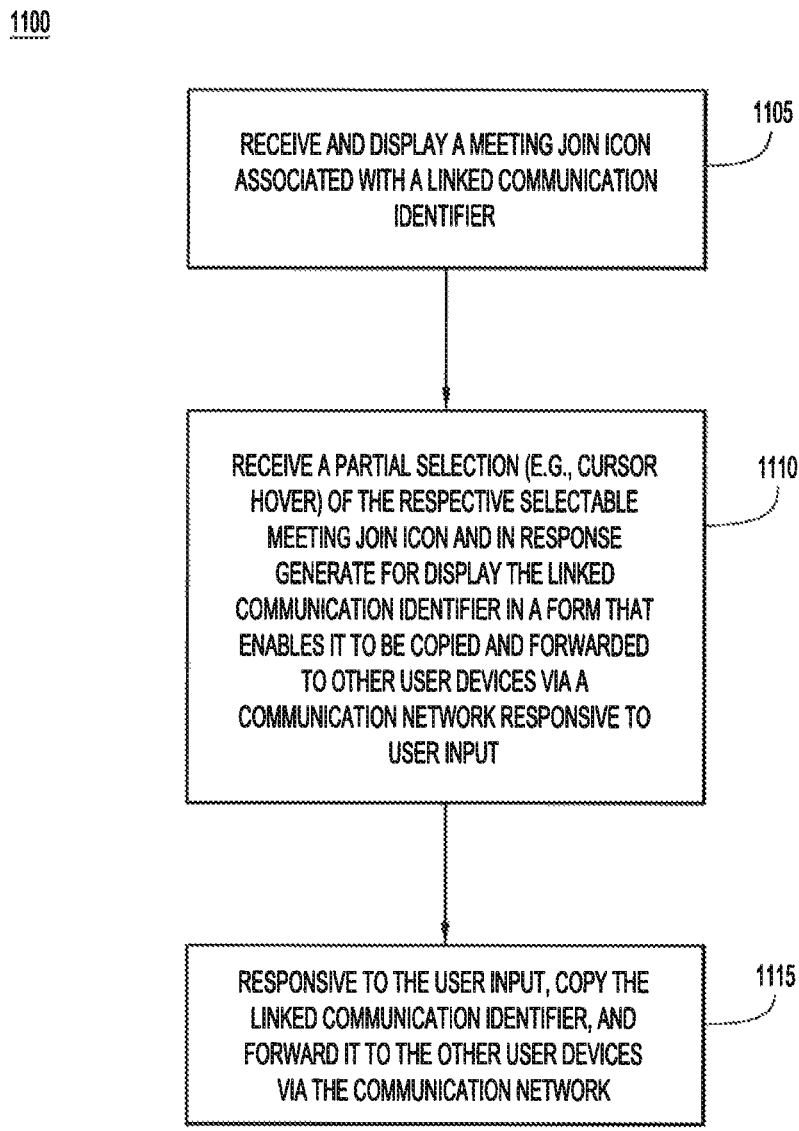
FIG. 11 is a flowchart of a method of assisting users in joining the communication session that may be performed at any of the user devices participating in the collaboration room, according to an example embodiment.

With reference to FIG. 10, there is shown a user interface screen 1000 generated by the Service and displayed on the second user device when the second user device is connected to the lobby. User interface screen 1000 includes an icon 1005 that indicates an identity of the user who started the communication session (e.g., the first user) and a notification 1010 that the second user is waiting to be admitted to the communication session.

Returning to FIG. 4B, at 445, the Service receives from one of the user devices of users who are members of the collaboration room a selection of the selectable Admit option. Responsive to the selection of the Admit option, the Service connects the second user device to the communication session, i.e., switches the second user device from the lobby to the communication session.

At 450, the Service receives a notification that the communication session has ended and in response, unlinks the linked communication identifier from the communication session and the collaboration room. The notification that the communication session has ended may be received from the first user device after the first user has selected an "end communication session" option at the first user device, which causes the first user device to send the selection to the Service. Once the linked communication identifier has been unlinked, any user clicking that link would be taken into the lobby, and the owner of that URL—and only the owner—would be notified.

In an example that invokes operations described in connection with method 400, assume there is collaboration room (referred to simply as "room") called "Design Team," which has user members Alice, Bob and Carol. Alice clicks the start-communication-session option 520 on user interface screen 500 displayed on her user device to start a web-based meeting (referred to simply as a "meeting") in the room. This lends her personal communication identifier/personal join link, e.g., URL—meetings.collabroom.com/alice—to the room. All other user in the room receive a notification on their respective user interface screens 600, such as, "Alice has started a meeting in room Design Team." Bob and Carol join the meeting by clicking on their respective join communication session (e.g., join meeting) options 620, which also indicate that Alice started the meeting. The in-meeting user interface screen indicates that Alice's URL can be obtained, e.g., at join meeting option 620 via dialog box 710. Bob wants to add Dyan to the meeting. Bob knows that Alice started the meeting, and it is confirmed with the in-meeting visual indicator, e.g., option 620. Assuming Bob knows Alice's personal URL, Bob may tell Dyan verbally, "please join us in Alice's URL." Dyan has bookmarked this URL. She selects the bookmark. In this case, Alice is authenticated with the collaboration service as she is an active collaboration service user. Dyan is taken into the lobby. All users in the Design Team room—Alice, Bob and Carol, see a notification (e.g., similar to 912) on their respective user interface screens that Dyan is waiting. Carol actually admits her by clicking the "Admit" option.

The embodiment described above also applies to 1-1 collaboration rooms. A 1-1 collaboration room may be viewed as a 1-1 voice call. Assume a call is initiated by Alice from a phone. Alice enters Bob's extension. This automatically binds Alice's personal URL (i.e., join link) to the call once Bob answers. At that point, if Alice wants to add Charlie, she can message Charlie via a collaboration room, SMS, email, and so on, "join me in my room meetings.ciscospark.com/alice." When Charlie clicks the link, he connects to the meeting. This would prompt Alice on her phone (and on her collaboration room) that Charlie basically wants to join the ongoing 1-1 call with Bob. She can then approve and this adds him to the call.

The embodiment may be extended to cases where a user has multiple calls at the same time. Always one is live and the others are on-hold. The on-hold calls may be treated like a meeting lobby. The personal URL is linked to all calls;

when Charlie clicks it, he joins the one that is live (not on hold) at the time Alice approves.

With reference to FIG. 1, there is a flowchart of a method 1100 of assisting users in joining the communication session that may be performed at any of the user devices participating in the collaboration room. Method 1100 is performed in connection with user interface screens 600/700, for example, displayed on the user devices participating in the collaboration room, after the communication session has been initiated.

At 1105, the user device receives and displays a join meeting option (e.g., option 620) associated with the linked communication identifier of the first user (who initiated the communication session).

At 1110, responsive to user input, the user device receives a partial selection of (e.g., via hovering a cursor over) the selectable join meeting icon and, in response, generates for display on the user device the linked communication identifier in a form that enables/allows it to be copied to a clipboard (e.g., see dialog box 715) and forwarded to other user devices via communication network 126 responsive to user input.

At 1115, responsive to the user input, the user device copies the linked communication identifier, and forwards it to the other user devices via the communication network.

In summary, the embodiment described above simplifies the process of adding people to ad-hoc collaboration room meetings (or calls) by binding the personal communication identifier, e.g., URL, of the initiator to the meeting and its associated collaboration room. The collaboration room is smart and knows about this binding, so if non-room members click the link, they are taken into a lobby which notifies everyone in the room. When the meeting ends, the linkage to the ad-hoc meeting and its associated room is broken. This means that adding a user is as simple as informing them of the personal URL of the initiator. Because these are mnemonic and persistent it is easy to do, similar to PMR meetings.

The embodiments advantageously:
a. avoid the need for the adder to know or discover the email address of the person being added;
b. allow verbal communications, email, texting, chat, or other techniques to communicate the information needed to join the meeting;
c. allow for cases where the join information is so well known (bookmarked or memorized) that highly informal channels, like texting someone "join us in Bob's link" can be used to join others into the meeting; and
d. build upon the popular PMR concept, which has proven an easy way to get people to join a meeting.

When considering the regular deskphone call case, the embodiments improve on the usual hitting "conference," dialing another participant, and then hitting "conference" again.

Figure 12:
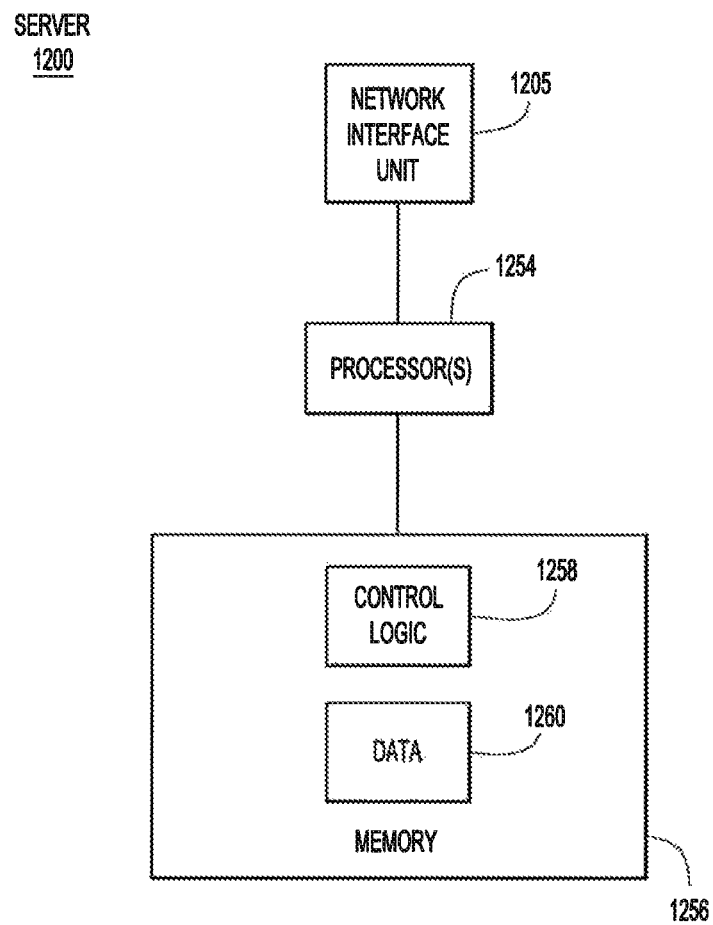
FIG. 12 is a block diagram of a computer system to host the communication session access service and/or chat service and perform the operations described herein, according to an example embodiment.

With reference to FIG. 12, there is a block diagram of an example computer device 1200 for hosting/implementing CSA service 120 or chat service 124. Computer device 1200 may represent CSA server 118 or chat server 123. Computer device 1200 includes network interface unit 1205 to communicate with a wired and/or wireless communication network so as to communicate with calendar service 106, call service 112, meeting service 116, CSA service 120/chat service 124 in the case where computer device represents chat server 123/CSA server 118, and client devices 102. Computer device 1200 also includes a processor 1254 (or multiple processors, which may be implemented as software or hardware processors), and memory 1256. Network interface unit 1205 may include an Ethernet card with a port (or multiple such devices) to communicate over wired Ethernet links and/or a wireless communication card with a wireless transceiver to communicate over wireless links.

Memory 1256 stores instructions for implementing methods described herein. Memory 1256 may include read only memory (ROM), random access memory (RAM), magnetic disk storage media devices, optical storage media devices, flash memory devices, electrical, optical, or other physical/tangible (non-transitory) memory storage devices. The processor 1254 is, for example, a microprocessor or a microcontroller that executes instructions stored in memory. Thus, in general, the memory 1256 may comprise one or more tangible computer readable storage media (e.g., a memory device) encoded with software comprising computer executable instructions and when the software is executed (by the processor 1254) it is operable to perform the operations described herein. Memory 1256 stores control logic 1258 to perform operations of CSA service 120 and/or chat service 124 described herein, so as to implement methods 200 and 400 for example. The memory 1256 may also store data 1260 used and generated by logic 1258, such as communication identifiers, personal identifiers, collaboration room membership lists, and information from session mapping database 122. Memory 1256 also stores associations or mappings between join options (buttons) and join links to communication sessions.

Figure 13:
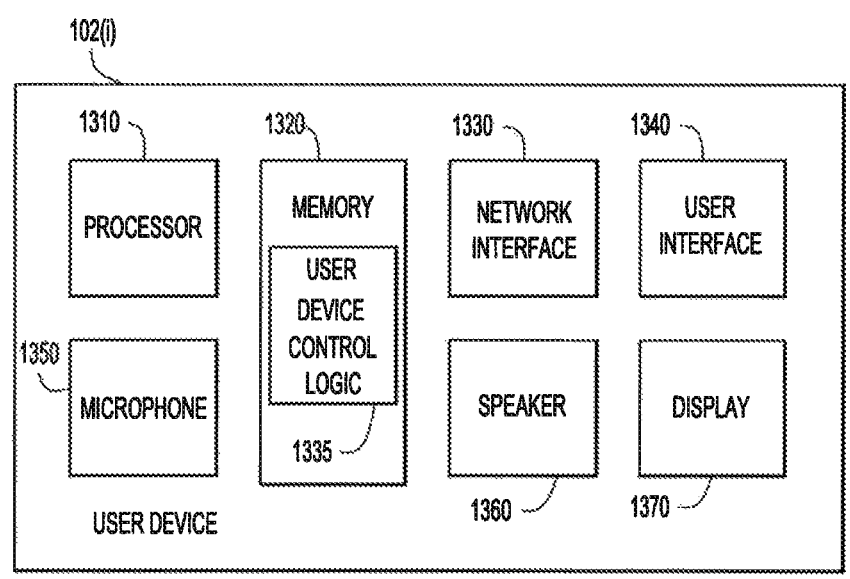
FIG. 13 is a block diagram of a user device, according to an embodiment.

Referring now to FIG. 13, a block diagram of a user device 102(*i*) is shown, according to an embodiment. The user device 102(*i*) includes a processor 1310 to process instructions relevant to communication sessions, memory 1320 to store a variety of data and software instructions. The processor 1310 is, for example, a microprocessor or microcontroller that executes instructions of user device control logic 1335 in memory 1320 for implementing the processes described herein in association with methods 200, 400, and 1100. The user device 102(*i*) also includes a network interface unit (e.g., card) 1330 to communicate with other devices over network 126. Network interface unit 1330 may include an Ethernet card with a port (or multiple such devices) to communicate over wired Ethernet links and/or a wireless communication card with a wireless transceiver to communicate over wireless links.

User device 102(*i*) may further include a user interface unit 1340 to receive input from a user, microphone 1350 and speaker 1360. The user interface unit 1340 may be in the form of a keyboard, mouse and/or a touchscreen user interface to allow for a user to interface with the user device 102(*i*). Microphone 1350 and speaker 1360 enable audio to be recorded and output. User device 102(*i*) may also comprise a display 1370, including, e.g., a touchscreen display, that can display data to a user.

Memory 1320 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 1320 may comprise one or more tangible (non-transitory) computer readable storage media (e.g., a memory device) encoded with software (e.g., user device control logic/software 1335) comprising computer executable instructions and when the software is executed (by the processor 1310) it is operable to perform the operations described herein. Logic 1335 includes instructions to generate and display graphical user interfaces to present information on display 1370 and allow a user to provide input to the user device 102(*i*) through, e.g., user selectable options of the graphical user interface. Memory 1320 also stores data generated and used by user device control logic 1335.

In summary, in one aspect, a method is provided comprising: at one or more servers configured to host a web-based collaboration room through which user devices of users who are members of the collaboration room communicate, wherein each of the users who is a member is assigned a distinct communication identifier used to initiate or access a communication session supported by a communication service: generating for display at each of the user devices a respective selectable start option associated with the communication identifier assigned to the user of the user device; receiving from a first user device among the user devices a selection of the respective start option and that includes the communication identifier of a first user among the users; and in response to the receiving: initiating a communication session, connecting the first user device to the communication session, linking the received communication identifier to the communication session, and generating for display at each of the user devices a respective selectable join option associated with the linked communication identifier and by which the communication session is accessible.

In another aspect, an apparatus is provided comprising: a network interface unit to communicate with a network; and a processor coupled to the network interface unit and configured to host a web-based collaboration room through which user devices of users who are members of the collaboration room communicate, wherein each of the users who is a member is assigned a distinct communication identifier used to initiate or access a communication session supported by a communication service, wherein the processor is further configured to: generate for display at each of the user devices a respective selectable start option associated with the communication identifier assigned to the user of the user device; receive from a first user device among the user devices a selection of the respective start option and that includes the communication identifier of a first user among the users; and in response to the receiving: initiate a communication session, connect the first user device to the communication session, link the received communication identifier to the communication session, and generate for display at each of the user devices a respective selectable join option associated with the linked communication identifier and by which the communication session is accessible.

In yet another aspect, a non-transitory, tangible, computer readable medium is provided. The computer readable medium stores instructions that, when executed by a processor associated with one or more servers configured to host a web-based collaboration room through which user devices of users who are members of the collaboration room communicate, wherein each of the users who is a member is assigned a distinct communication identifier used to initiate or access a communication session supported by a communication service, cause the processor to: generate for display at each of the user devices a respective selectable start option associated with the communication identifier assigned to the user of the user device; receive from a first user device among the user devices a selection of the respective start option and that includes the communication identifier of a first user among the users; and in response to the receiving: initiate a communication session, connect the first user device to the communication session, link the received communication identifier to the communication session, and generate for display at each of the user devices a respective selectable join option associated with the linked communication identifier and by which the communication session is accessible.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
at one or more servers configured to host a web-based collaboration room through which user devices of users who are members of the collaboration room communicate, wherein each of the users who is a member is assigned a distinct communication identifier used to initiate or access a communication session supported by a communication service:
learning information about communication sessions that are in-progress and that are scheduled for the users from a communication service for web-based meetings and a calendar service that maintains invitee lists and meeting times for the communication sessions;
based on the information, mapping, in a database, each communication identifier to a corresponding list of communication sessions among the communication sessions that the user to which the communication identifier is assigned is currently participating and is scheduled to participate, such that the communication identifier does not uniquely identify any specific communication session, wherein the lists of communication sessions include the invitee lists and the meeting times for the communication sessions;
generating for display at each of the user devices a respective start option that is selectable associated with the communication identifier assigned to the user of the user device;
receiving from a first user device among the user devices a selection of the respective start option and that includes the communication identifier of a first user among the users;
in response to the receiving: initiating a communication session from the list of communication sessions corresponding to the communication identifier, connecting the first user device to the communication session, linking the communication identifier to the communication session so that the communication identifier becomes a linked communication identifier that identifies the communication session in the list of communication sessions and can be passed to and used by other users to join the other users to the communication session, and generating for display at each of the user devices a respective selectable join option associated with the linked communication identifier and by which the communication session is accessible; and
responsive to receiving from a second user device a join request to join the communication session, the join request including the linked communication identifier and a second user identifier of a second user of the second user device:
determining whether the second user is a member of the collaboration room;
if the second user is a member of the collaboration room, connecting the second user device to the communication session using the linked communication identifier; and if the second user is not a member of the collaboration room, connecting the second user device to a web-based lobby instead of to the communication session, and generating for display at each of the user devices of the users who are members of the collaboration room and are connected to the collaboration room a respective selectable admit option used to admit the second user to the communication session and a selectable deny option used to deny the second user access to the communication session.

2. The method of claim 1,
wherein each communication identifier includes a respective Hypertext Transfer Protocol (HTTP) Uniform Resource Locator (URL).

3. The method of claim 1,
wherein each communication identifier includes a respective Session Initiation Protocol (SIP) Uniform Resource Indicator (URI).

4. The method of claim 1, wherein the determining includes:
ascertaining a user identifier of the second user;
if the user identifier is on a list of members of the collaboration room, determining that the second user is a member of the collaboration room; and
if the user identifier is not on the list of members of the collaboration room, determining that the second user is not a member of the collaboration room.

5. The method of claim 4, wherein the user identifier is an email address of the second user and the list of members includes a list of email addresses of the members.

6. The method of claim 1, further comprising, at the one or more servers:
receiving from one of the user devices of users who are members of the collaboration room a selection of the respective selectable admit option; and
responsive to receiving the selection of the respective selectable admit option, connecting the second user device to the communication session.

7. The method of claim 1, further comprising, at one of the user devices:
receiving a selection of the respective selectable join option associated with the linked communication identifier; and
in response to the selection of the respective selectable join option, generating for display the linked communication identifier in a form that enables the linked communication identifier to be copied and forwarded to other user devices via a communication network.

8. The method of claim 7, further comprising, at the one of the user devices:
after the generating for display the linked communication identifier:
copying the linked communication identifier linked with the communication session, to produce a copied linked communication identifier; and
forwarding the copied linked communication identifier to the other user devices via the communication network.

9. The method of claim 1, further comprising:
connecting a second user device to the communication session using the linked communication identifier of the first user, and linking a communication identifier of a second user of the second user device to the communication session; and
connecting a third user device to the communication session using the linked communication identifier of the second user.

10. The method of claim 1, further comprising, at the one or more servers:
receiving from a second user device a join request to join the communication session, the join request including the linked communication identifier and a second user identifier of a second user;
in response to receiving the join request, determining whether to connect the second user device to the communication session as identified by the linked communication identifier, based on the second user identifier; and
if is determined to connect the second user device, connecting the second user device to the communication session using the linked communication identifier.

11. The method of claim 1, wherein the mapping includes mapping each communication identifier to the corresponding list through a user identifier of the user to which the communication identifier is assigned.

12. An apparatus comprising:
a network interface unit to communicate with a network; and
a processor coupled to the network interface unit and configured to host a web-based collaboration room through which user devices of users who are members of the collaboration room communicate, wherein each of the users who is a member is assigned a distinct communication identifier used to initiate or access a communication session supported by a communication service, wherein the processor is further configured to:
learn information about communication sessions that are in-progress and that are scheduled for the users from a communication service for web-based meetings and a calendar service that maintains invitee lists and meeting times for communication sessions;
based on the information, map, in a database, each communication identifier to a corresponding list of communication sessions that the user to which the communication identifier is assigned is currently participating and is scheduled to participate, such that the communication identifier does not uniquely identify any specific communication session, wherein the lists of communication sessions include the invitee lists and the meeting times for the communication session;
generate for display at each of the user devices a respective start option that is selectable associated with the communication identifier assigned to the user of the user device;
receive from a first user device among the user devices a selection of the respective start option and that includes the communication identifier of a first user among the users; and
in response to the receiving: initiate a communication session from the list of communication sessions corresponding to the communication identifier, connect the first user device to the communication session, link the communication identifier to the communication session so that the communication identifier becomes a linked communication identifier that identifies the communication session in the list of communication sessions and can be passed to and used by other users to join the other users to the communication session, and generate for display at each of the user devices a respective selectable join option associated with the linked communication identifier and by which the communication session is accessible; and responsive to receiving from a second user device a join request to join the communication session, the join request including the linked communication identifier and a second user identifier of a second user of the second user device:
- determine whether the second user is a member of the collaboration room;
- if the second user is a member of the collaboration room, connect the second user device to the communication session using the linked communication identifier; and
- if the second user is not a member of the collaboration room, connect the second user device to a web-based lobby instead of to the communication session, and generate for display at each of the user devices of the users who are members of the collaboration room and are connected to the collaboration room a respective selectable admit option used to admit the second user to the communication session and a selectable deny option used to deny the second user access to the communication session.

13. The apparatus of claim 12, wherein
each communication identifier includes a respective Hypertext Transfer Protocol (HTTP) Uniform Resource Locator (URL).

14. The apparatus of claim 12, wherein
each communication identifier includes a respective Session Initiation Protocol (SIP) Uniform Resource Indicator (URI).

15. The apparatus of claim 12, wherein the processor is further configured to:
- receive from one of the user devices of users who are members of the collaboration room a selection of the respective selectable admit option; and
- responsive to receiving the selection of the respective selectable admit option, connect the second user device to the communication session.

16. The apparatus of claim 12, wherein the processor is configured to generate for display at each user device the respective selectable join option by generating for display at each user device an indication of an identity of the user to whom the linked communication identifier is assigned.

17. A non-transitory computer readable medium storing instructions that, when executed by a processor associated with one or more servers configured to host a web-based collaboration room through which user devices of users who are members of the collaboration room communicate, wherein each of the users who is a member is assigned a distinct communication identifier used to initiate or access a communication session supported by a communication service, cause the processor to:
- learn information about communication sessions that are in-progress and that are scheduled for the users from a communication service for web-based meetings and a calendar service that maintains invitee lists and meeting times for communication sessions;
- based on the information, map, in a database, each communication identifier to a corresponding list of communication sessions that the user to which the communication identifier is assigned is currently participating and is scheduled to participate, such that the communication identifier does not uniquely identify any specific communication session, wherein the lists of communication sessions include the invitee lists and the meeting times for the communication session;
- generate for display at each of the user devices a respective start option that is selectable associated with the communication identifier assigned to the user of the user device;
- receive from a first user device among the user devices a selection of the respective start option and that includes the communication identifier of a first user among the users; and
- in response to the receiving: initiate a communication session from the list of communication sessions corresponding to the communication identifier, connect the first user device to the communication session, link the communication identifier to the communication session so that the communication identifier becomes a linked communication identifier that identifies the communication session in the list of communication sessions and can be passed to and used by other users to join the other users to the communication session, and generate for display at each of the user devices a respective selectable join option associated with the linked communication identifier and by which the communication session is accessible; and
- responsive to receiving from a second user device a join request to join the communication session, the join request including the linked communication identifier and a second user identifier of a second user of the second user device:
  - determine whether the second user is a member of the collaboration room;
  - if the second user is a member of the collaboration room, connect the second user device to the communication session using the linked communication identifier; and
  - if the second user is not a member of the collaboration room, connect the second user device to a web-based lobby instead of to the communication session, and generate for display at each of the user devices of the users who are members of the collaboration room and are connected to the collaboration room a respective selectable admit option used to admit the second user to the communication session and a selectable deny option used to deny the second user access to the communication session.

18. The non-transitory computer readable medium of claim 17,
wherein each communication identifier includes a respective Hypertext Transfer Protocol (HTTP) Uniform Resource Locator (URL).

19. The non-transitory computer readable medium of claim 17,
wherein each communication identifier includes a respective Session Initiation Protocol (SIP) Uniform Resource Indicator (URI).

20. The non-transitory computer readable medium of claim 17, further comprising instructions to cause the processor to:
- receive from one of the user devices of users who are members of the collaboration room a selection of the respective selectable admit option; and
- responsive to receiving the selection of the respective selectable admit option, connect the second user device to the communication session.

* * * * *